UNITED STATES PATENT OFFICE.

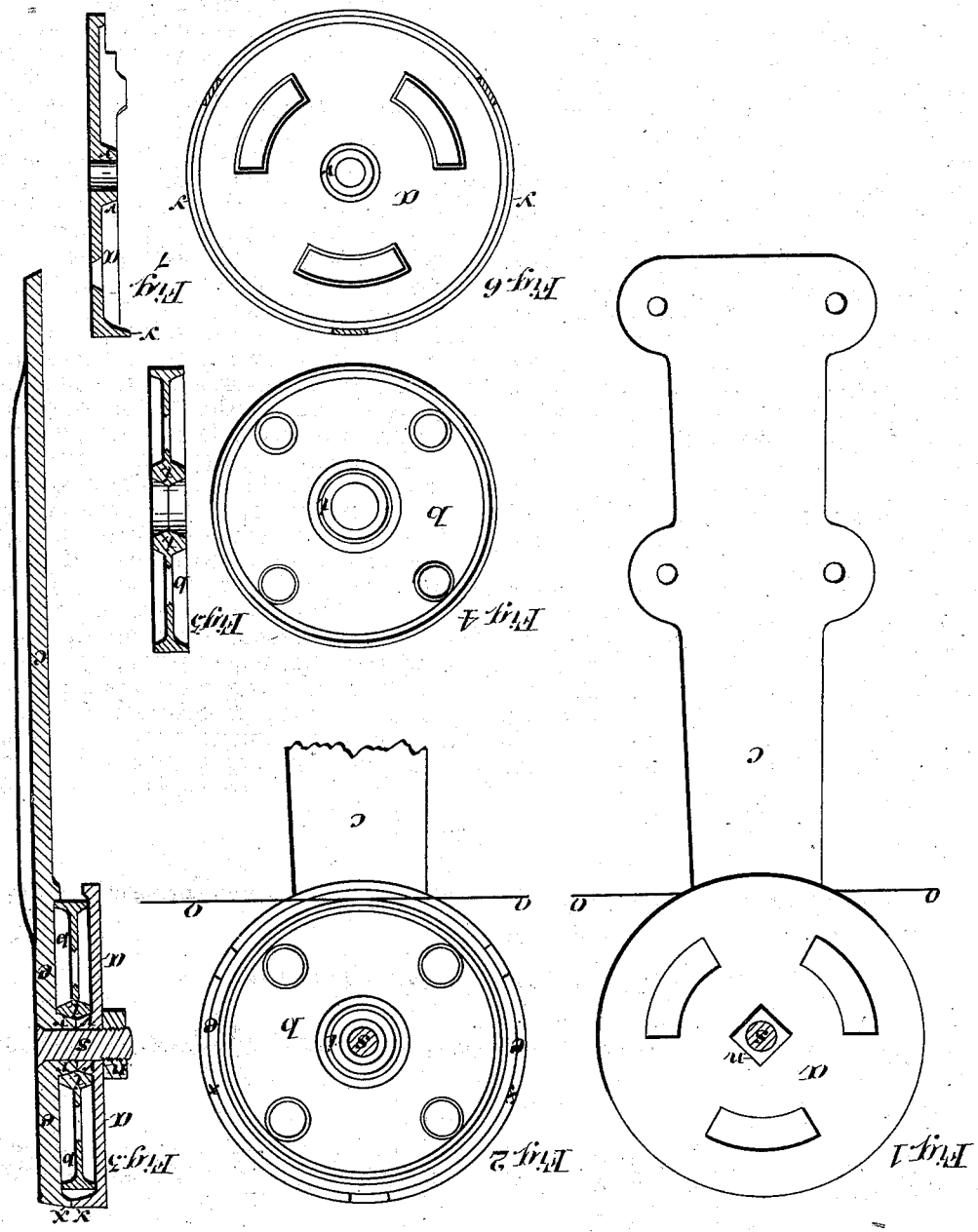

ELIJAH U. SCOVILLE AND WASHINGTON L. SCOVILLE, OF MANLIUS, N. Y.

IMPROVEMENT IN DOOR-HANGERS.

Specification forming part of Letters Patent No. 155,623, dated October 6, 1874; application filed August 14, 1874.

*To all whom it may concern:*

Be it known that we, ELIJAH U. and WASHINGTON L. SCOVILLE, of Manlius, in the county of Onondaga and State of New York, have invented a new and useful Improvement in Door-Hangers, of which the following, taken in connection with the accompanying drawing, is a full, clear, and exact description:

The object of this invention is to obtain a door-hanger that can be cheaply manufactured, and at the same time shall be durable and simple in construction. It consists in a novel method of making it in sections, that can be easily molded and cast, and readily put together and secured by a bolt, that shall not be subjected to any wear or friction from the wheel, and without necessitating any drilling for the bolt-hole, or any lathe or other extra work to fit them, as will be hereinafter more fully described.

In the drawing, Figure 1 is a view from the rear of one of these hangers; Fig. 2, partly the same, with the cap removed; Fig. 3, a sectional view of one of our improved hangers; Fig. 4, a plan of the wheel; Fig. 5, a section of same; Fig. 6, a view of the inner face of the cap or cover, and Fig. 7 a section of same.

$c$ is the part which is attached to the door, having a circular head, $e$, which has a projecting rim or flange around its inner face, and a truncated cone, $r$, in the center. $a$ is a cap or cover, having a corresponding rim and truncated cone, $v$. The rim around the cap is provided with projections, fitting into notches in the rim of the head to prevent the cap from turning. $s$ is a bolt passing through the truncated cones $r$ and $v$; $n$, a nut, which fastens the cap $a$ to the head $e$. $b$ is the wheel placed between the head and cap, and provided with hub $i$, beveled and fitted to revolve on the journal formed by the cones $r$ and $v$, as best shown in Fig. 3. The line $o\ o$ represents the top of the rail, from which the hanger is suspended, and upon which it travels. The flanges on the head and cap are here reduced sufficiently to admit the rail and allow the wheel to rest upon it, the remaining portion acting as guide for the wheel. The journals $r$ and $v$ and hub $i$ are to be face-hardened, and since the wear and friction is upon them, and not upon the center pin or bolt, a strong and durable hanger is obtained; and, by beveling all the projections and edges in the manner shown, the sections are easily molded and cast, and readily fastened together by any ordinary bolt.

What we claim as new, and desire to secure by Letters Patent, is—

The improved door-hanger herein described, consisting of the part $c$, having head $e$, with truncated cone $r$ cast thereon, the cap $a$, with truncated cone $v$, likewise cast thereon, the wheel $b$, having hub $i$, and the bolt $s$, all constructed and arranged substantially as and for the purpose set forth.

In testimony whereof we have signed our names and affixed our seals in the presence of two attesting witnesses, at Manlius, in the county of Onondaga and State of New York, this 10th day of August, 1874.

ELIJAH U. SCOVILLE. [L. S.]
WASHINGTON L. SCOVILLE. [L. S.]

Witnesses:
A. H. JEROME,
FRANCIS EVERSON.